(235 Beach 19th St., Far Rockaway, N.Y.)
Filed Mar. 3, 1964, Ser. No. 349,054
7 Claims. (Cl. 74—441)

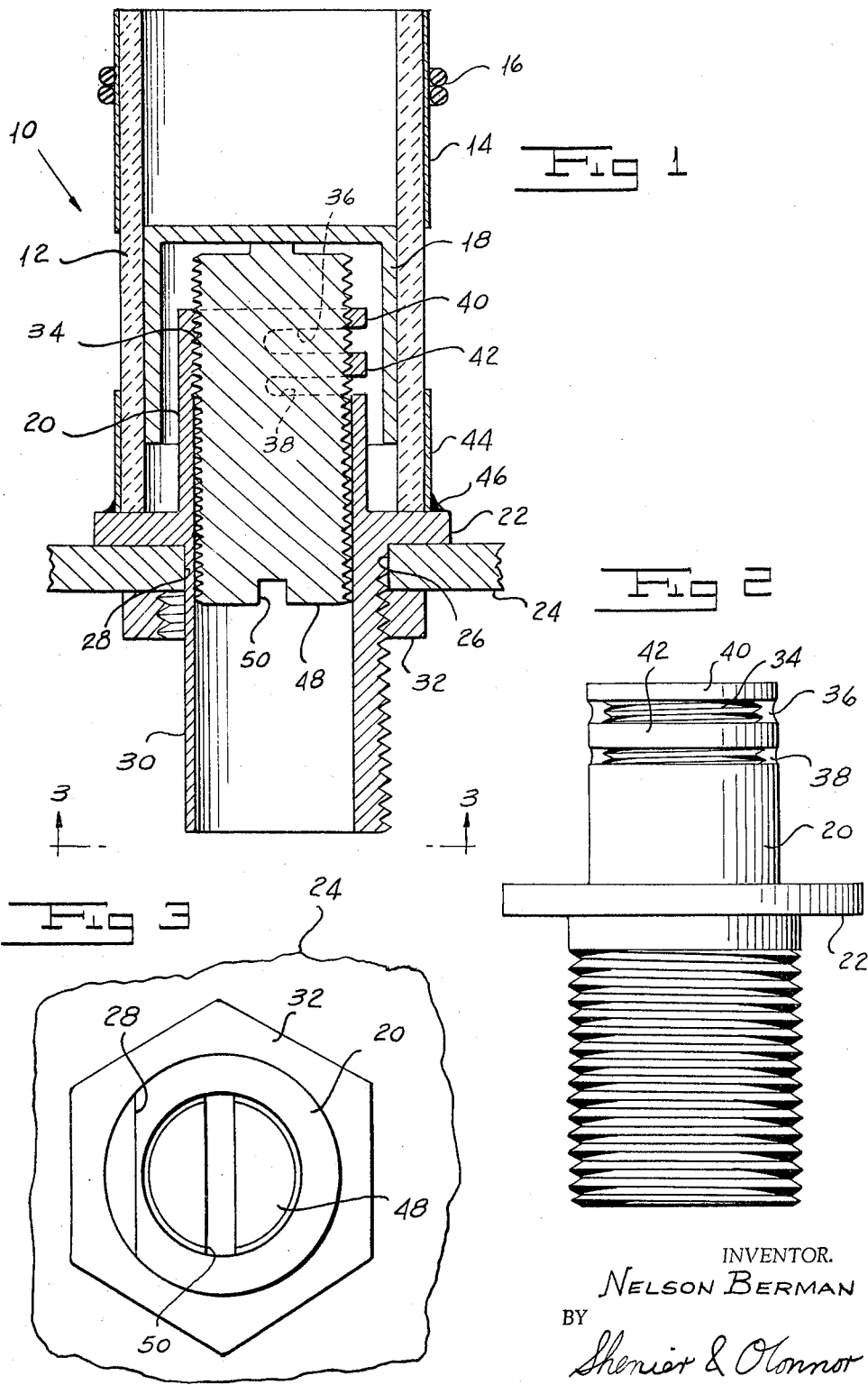

My invention relates to a torque element and more particularly to an improved torque element for driving relatively movable parameter-varying elements without disturbing the concentricity thereof.

In the prior art there are known many electrical devices in which relatively movable members are driven to vary a circuit parameter. For example, trimmer capacitor elements are given in response to actuation of one of two interengageable threaded elements.

In precision trimmer capacitors, precision bored tubing carrying one of the capacitor elements receives the other capacitor element which is in the form of a piston. The tubing, which usually is made of an insulating material such as glass, has an interior diameter which is only a few ten-thousandths of an inch greater than the outside diameter of the piston. In order to avoid jamming of the piston within the tubing and possibly breaking the tubing when the piston is turned, it is essential that the tube, the piston and the threaded elements which drive the piston and tube relative to each other be substantially concentric within close tolerances.

It is also required in devices of the nature of the trimmer capacitor that the relatively movable members be driven with predetermined torque and that they have very little backlash and will not accidentally move in response to shock or vibration. The more precise the required relative positioning of the members, the more important these considerations become.

My copending application, Serial No. 314,766, filed October 8, 1963, for a Torque Element, discloses a torque element for positioning relatively movable parameter-varying members with a high degree of accuracy and very little backlash and in response to a predetermined torque so that the elements will not be likely to move accidentally in response to shock and vibration. Specifically, in the device disclosed in my copending application one of the threaded elements is provided with a slot extending transversely of the longitudinal axis of the element to form a part which is bent slightly with respect of the remainder of the element so that the natural resilience of the part ensures the engagement of the threads of the two elements when they are threaded together.

While the arrangement shown in my copending application satisfactorily performs the function of ensuring a predetermined frictional engagement of interengageable threaded elements, I have discovered that it is not as satisfactory as is desirable where a high degree of concentricity of relatively movable parameter-varying members must be maintained. That is, after the part of the member has been bent to produce the desired frictional engagement the required concentricity is destroyed.

I have invented an improved torque element which overcomes the defects of the torque elements of the prior art. My improved element provides the desired frictional engagement between threaded elements while at the same time maintaining a high degree of concentricity between the parts. It has substantially no lost motion. It provides a uniform torque in all relative positions of the threaded members. It is highly resistant to accidental displacement by shock or vibration. It is simple in its construction and operation for the result achieved thereby.

One object of my invention is to provide an improved torque element which positions relatively movable parameter-varying members with a high degree of accuracy while maintaining the concentricity of the members.

Another object of my invention is to provide an improved torque element which provides a predetermined frictional engagement between threaded driving elements while maintaining the concentricity of members relatively positioned by the elements.

A further object of my invention is to provide an improved torque element which has substantially no lost motion and is highly resistant to accidental displacement by shock or vibration.

Other and further objects of my invention will appear from the following description.

In general my invention contemplates the provision of interengageable threaded elements for supporting closely fitting parameter-varying members for relative movement to vary an electric circuit parameter in which I form one of the elements with spaced slots extending transversely to the longitudinal axis of the element to provide a pair of fingers which are slightly bent toward or away from each other to ensure interengagement of the threads of the element without disturbing the concentricity of the parameter-varying members.

In the accompanying drawings which form part of the tion therewith and in which like reference numerals are used to indicate like parts in the various views:

FIGURE 1 is a sectional view of a trimmer capacitor provided with my improved torque element.

FIGURE 2 is an elevation of my improved torque element.

FIGURE 3 is a bottom plan view of the trimmer capacitor shown in FIGURE 1.

Referring now to the drawings, I have shown a parameter-varying device indicated generally by the reference character 10 which may, for example, be a trimmer capacitor, the dielectric of which is formed by the precision bored tube or cylinder 12 of a suitable relatively rigid insulating material such, for example, as glass. One of the capacitor electrodes is formed by an area of conductive material 14 applied over the upper portion of the tube 12 in any suitable manner known to the art. Turns 16 of a conductor may be soldered to the conductive material 14 to permit an electrical connection to be made to the coating 14.

A piston 18 of a suitable conductive material comprises the other electrode of the capacitor. Piston 18 fits very closely within the tube 12 and is adapted to be moved in the direction of the longitudinal axis of the tube in order to vary the capacitance of the capacitor 10.

The particular form of my improved torque element which I have illustrated in the drawings is a sleeve 20 formed of any suitable conductive material. Intermediate its ends, sleeve 20 has a flange 22 which rests on a supporting member 24. I provide the member 24 with an opening 26 which receives the sleeve 20. Opening 26 is provided with a flat 28 which is engaged by a corresponding flat 30 on the lower portion of sleeve 20 properly to position the sleeve when it is inserted in the opening 26. I thread the lower portion of the sleeve 20 to permit it to receive a nut 32 which secures the sleeve in position on the support 24.

In making the sleeve 20 I provide the upper portion thereof with internal threads 34 for a short distance along the inside of the tube 30. Having done this, I cut a first slot 36 in the tube wall with the slot extending into the tube in a direction transverse to the longitudinal axis of the sleeve for a distance which is slightly greater than the diameter of the sleeve. I then cut a second transversely extending slot 38 in the wall of the tube 20 for substantially the same distance as the slot 36. The two slots 36 and 38 form what may be termed a pair of fingers 40 and 42 in the wall of the sleeve. It will be appreciated that the two fingers 40 and 42 are in the internally threaded portion of the sleeve. Once the fingers have been formed I bend them slightly toward or away from each other.

I provide the lower portion of the glass tube 12 with a conductive coating 44 which permits the tube to be connected to the flange 22 of the torque element by any suitable means such as by solder 46. I connect the piston 18 to the upper end of a screw 48 by any suitable means such as soldering or brazing or the like. Screw 48 has a slot 50 adapted to be engaged by a suitable tool such as a screwdriver inserted in the tube 20 to actuate the screw.

Screw 48 is received by the internal threads formed on the fingers 40 and 42. As the screw is threaded into the tube the natural resilience of the tube material ensures that the threads of the fingers engage the threads of the screw 48 with a predetermined frictional force. Owing to the fact that the fingers 40 and 42 act in opposite directions this close frictional fit is achieved without disturbing the concentricity of the piston 18 with relation to the tube 12. Consequently when the screw 48 is turned the piston 18 moves up or down the tube 12 without danger of jamming and possibly breaking the tube 12.

It will be noted that the slot 36 is wider than is the slot 38. In making my device I make the slot 36 as wide as is practicable considering the dimensions of the parts so that less bending per unit length is required as the screw is threaded into the sleeve. Since most of the bending takes place in the portion of the sleeve at the base of the slot 36 as the parts are screwed together, I have found that the slot 38 need not be wide as compared with the slot 36. A further advantage of my construction is that since I have two bendable elements, 40 and 42, I do not need as much deflection in each to provide the required frictional force as is necessary where only one element is provided. Thus I can increase the frictional force further without danger of breaking the sleeve 20.

In use of my improved torque element as the screw 48 is introduced into the tube 20 it will bend the fingers 40 and 42 back from the slightly distorted positions to which they were moved in the course of formation of the element to provide the desired torque. Owing to the fact that the fingers act in opposite directions the operation of assembling the screw in the tube 20 can be achieved without danger of disturbing the concentricity of the elements of the device which, if it were done, would cause jamming of the piston 18 and possible fracturing of the tube 12 when the screw was turned. Having assembled the parts the capacitance provided by the capacitor 10 can be changed by actuating the screw 48 to move the piston 18 up or down in the tube 12.

It will be seen that I have accomplished the objects of my invention. I have provided an improved torque element which provides a predetermined frictional force between threaded elements without disturbing the concentricity of members driven by the elements. My torque element permits interengagement of threaded elements with substantially no lost motion and is highly resistant to shock and vibration.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a capacitor having a relatively rigid tube which slidably receives a piston forming an element of said capacitor for movement of said piston along the axis of said tube, an element having a wall defining a generally cylindrical bore, threads in said bore, said wall being provided with spaced slots forming a pair of fingers, means connecting said element to said capacitor tube, a screw carried by said threads, each of said fingers being resiliently biased toward said axis to grip said screw and means connecting said screw to said piston.

2. In an electrical device a pair of members adapted to be moved relative to each other along an axis to vary a circuit parameter, an element having a wall defining a generally cylindrical bore, threads in said bore, means connecting said element to one of said members, said wall being provided with spaced transverse slots forming a pair of fingers, a screw engaged with said threads, and means connecting said other member to said screw, each of said fingers being resiliently biased toward said axis to engage said screw.

3. In an electrical parameter-varying device, an actuating element having a wall defining a generally cylindrical bore having an axis, threads in said bore, said wall being provided with spaced transverse slots extending into said bore for at least half the diameter of said bore to form fingers carrying said threads, each of said fingers being resiliently biased toward said axis.

4. In an electrical parameter-varying device, an element having a wall defining a generally cylindrical bore having an axis, threads in said bore, said wall being provided with spaced transverse slots to define a pair of fingers carrying a portion of said threads, each of said fingers being resiliently biased toward said axis.

5. In an electrical device, a pair of members adapted to be moved relative to each other in the direction of an axis, means comprising interengaged threaded elements adapted to be actuated to move said members relative to each other, one of said elements having an internal generally cylindrical threaded surface, the other of said elements having an external generally cylindrical threaded surface, one of said elements being formed with a pair of fingers extending transversely of said axis, said fingers comprising a part of the threaded surface of the one member, each of said fingers being resiliently biased toward each other and toward said axis to grip said other element.

6. In an assembly, a pair of members adapted to be moved relative to each other in the direction of an axis, means comprising interengaged threaded elements adapted to be actuated to move said members relative to each other in the direction of said axis, one of said elements being formed with spaced transversely extending slots forming a pair of fingers, each of said fingers being resiliently biased away from each other and toward said axis to grip said other threaded element.

7. In an assembly, a pair of members adapted to be moved relative to each other in the direction of an axis, means comprising interengaged threaded elements adapted to be actuated to move said members relative to each other in the direction of said axis, one of said threaded elements being formed with a pair of fingers extending transversely of said axis, each of said fingers being resiliently biased toward said axis to grip said other threaded element.

References Cited by the Examiner
UNITED STATES PATENTS

| | | | |
|---|---|---|---|
| 2,116,036 | 5/1938 | Money | 151—21 |
| 2,607,826 | 8/1952 | Barnes | 74—424.8 X |
| 3,023,797 | 3/1962 | Greene | 151—21 X |
| 3,051,879 | 8/1962 | Lazar et al. | 74—424.8 X |
| 3,058,042 | 10/1962 | Barnes | 74—424.8 X |
| 3,153,753 | 10/1964 | Young | 74—424.8 X |

FOREIGN PATENTS 1,179,722  12/1958  France.

DAVID J. WILLIAMOWSKY, *Primary Examiner.*

L. H. GERIN, *Assistant Examiner.*